United States Patent [19]

Beard

[11] Patent Number: 4,457,844
[45] Date of Patent: Jul. 3, 1984

[54] CONTINUOUS WASTE WATER CLARIFICATION PROCESS

[76] Inventor: Harold J. Beard, P.O. Box 3838, Baton Rouge, La. 70821

[21] Appl. No.: 494,005

[22] Filed: May 12, 1983

Related U.S. Application Data

[63] Continuation-in-part of Ser. No. 370,802, Apr. 22, 1982, Pat. No. 4,383,922, which is a continuation-in-part of Ser. No. 316,112, Oct. 29, 1981, Pat. No. 4,362,625.

[51] Int. Cl.³ .............................................. C02F 3/22
[52] U.S. Cl. .................................... 210/624; 210/626; 210/629
[58] Field of Search ....................... 210/621, 623–626, 210/629, 926, 170, 195.3, 195.4

[56] References Cited

U.S. PATENT DOCUMENTS

| | | | |
|---|---|---|---|
| 1,247,542 | 11/1917 | Jones | 210/626 |
| 1,774,793 | 9/1930 | Egan | 210/237 |
| 2,233,218 | 2/1941 | Moore | 210/170 |
| 2,374,772 | 5/1945 | Nordell | 210/255 |
| 2,673,451 | 3/1954 | Gariel | 61/2 |
| 3,517,812 | 6/1970 | Bucchioni et al. | 210/262 |
| 3,701,429 | 10/1972 | Schell | 210/242 |
| 3,744,257 | 7/1973 | Spanner | 61/46.5 |
| 3,817,383 | 6/1974 | Michael | 210/170 |
| 3,846,292 | 11/1974 | LeCompte, Jr. | 210/629 |
| 3,901,798 | 8/1975 | Peterson | 209/143 |
| 4,038,185 | 7/1977 | Kline | 210/83 |
| 4,087,361 | 5/1978 | Block et al. | 210/199 |
| 4,116,835 | 9/1978 | Bertelson | 210/100 |
| 4,119,541 | 10/1978 | Makaya | 210/242 R |
| 4,134,835 | 1/1979 | Solum et al. | 210/178 |
| 4,147,634 | 4/1979 | Wegener | 210/396 |
| 4,152,267 | 5/1979 | Davis et al. | 210/331 |
| 4,157,301 | 6/1979 | Wegener | 210/404 |
| 4,159,243 | 6/1979 | Okey | 210/14 |
| 4,159,951 | 7/1979 | Davis | 210/331 |
| 4,219,424 | 8/1980 | Tamura et al. | 210/201 |
| 4,231,874 | 11/1980 | Heiligtag | 210/195.4 |
| 4,257,889 | 3/1981 | Wöber et al. | 210/104 |
| 4,265,757 | 5/1981 | Ivanoff | 210/242.3 |
| 4,303,516 | 12/1981 | Stensel et al. | 210/195.4 |
| 4,328,101 | 5/1982 | Broden | 210/320 |
| 4,360,427 | 11/1982 | Pasgate | 210/170 |
| 4,362,625 | 12/1982 | Beard | 210/170 X |
| 4,383,922 | 5/1983 | Beard | 210/170 X |

FOREIGN PATENT DOCUMENTS

| | | | |
|---|---|---|---|
| 514517 | 10/1952 | Belgium | 210/170 |
| 2932640 | 2/1971 | Fed. Rep. of Germany | 210/629 |
| 996122 | 12/1951 | France | 210/170 |
| 1556330 | 12/1967 | France . | |
| 373800 | 5/1939 | Italy | 210/170 |
| 2075856 | 11/1981 | United Kingdom | 210/926 |

Primary Examiner—Robert H. Spitzer
Attorney, Agent, or Firm—William David Kiesel

[57] ABSTRACT

A waste water stream is clarified by phase separation of a part of the stream in a clarifier positioned in an oxidation ditch, through the establishment of a head differential between the level of liquid in the clarifier and the level of liquid in the oxidation ditch.

23 Claims, 3 Drawing Figures

CONTINUOUS WASTE WATER CLARIFICATION PROCESS

RELATED APPLICATIONS

This is a continuation-in-part of Ser. No. 370,802, filed Apr. 22, 1982 now, U.S. Pat. No. 4,383,922, issued May 17, 1983, and entitled "Waste Water Clarifier", which patent is a continuation-in-part of Ser. No. 316,112 filed Oct. 29, 1981 now U.S. Pat. No. 4,362,625, issued Dec. 7, 1982, and entitled "Waste Water Clarifier", both by the inventor herein, and which specific mention is made thereof to obtain the benefit of their filing dates.

BACKGROUND OF THE INVENTION

1. Field of the Invention

This invention relates to a system for treating waste water and, more particularly, to a process utilizing oxidation ditch systems.

2. Prior Art

To remove impurities, such as sugars and other carbohydrates and proteins and other forms of nitrogen, as well as other types of pollutants from domestic sewage, industrial waste water or similar waste water streams, the use of an orbital or oxidation ditch system can be employed.

In its general usage, an orbital waste water treatment system includes an elongated tank having two sidewalls and at least one partition wall mounted vertically in the tank substantially parallel to the two sidewalls and spaced apart from the ends of the tank to form an endless, circuitous channel to contain a portion of the waste water stream. In a conventional system, the waste water is constantly circuitously flowed in the ditch while at the same time aerated to provide oxygen for microorganisms to decompose most of the pollutants. An example of such a system can be seen in U.S. Pat. No. 3,846,292, wherein a portion of the waste water put in the ditch is removed after aeration and then transferred to a conventional clarifier where heavier solid particles are separated out. Because of high construction costs, a system employing the clarifier in the ditch was developed; an example of which is seen in U.S. Pat. No. 4,303,516.

However, because of turbulence in the clarifier used as well as the cost of ditch and clarifier construction due to the use of settlement separation processes, even these systems were not as efficient as desired. This led to the development of improved clarifier designs as shown in applicant's U.S. Pat. Nos. 4,362,625 and 4,383,922, identified above. This invention relates to the improved process of treating waste water streams made possible by these improved clarifier designs.

SUMMARY OF THE INVENTION

Therefore, it is an object of this invention to provide an efficient process for treating waste water streams.

Another object of this invention is to provide a process for treating waste water streams at faster rates and less expensively.

Other objects and advantages of this invention shall become apparent from the ensuing descriptions of the invention.

Accordingly, a process for clarifying a waste water stream is provided comprising diverting a portion of the stream to an oxidation ditch having a clarifier provided with a rear opening to receive the liquid from the stream and bottom opening to allow flow out of the clarifier, causing the portion to flow in a direction toward the front of the clarifier, allowing the liquid to flow through the rear opening in a direction opposite that of the flow of the stream portion for a distance sufficient to separate the stream portion into a clarified phase and a sludge phase, removing the sludge phase through the bottom ports and removing the clarified phase to the waste water stream.

PREFERRED EMBODIMENTS OF THE INVENTION

Figure 1:
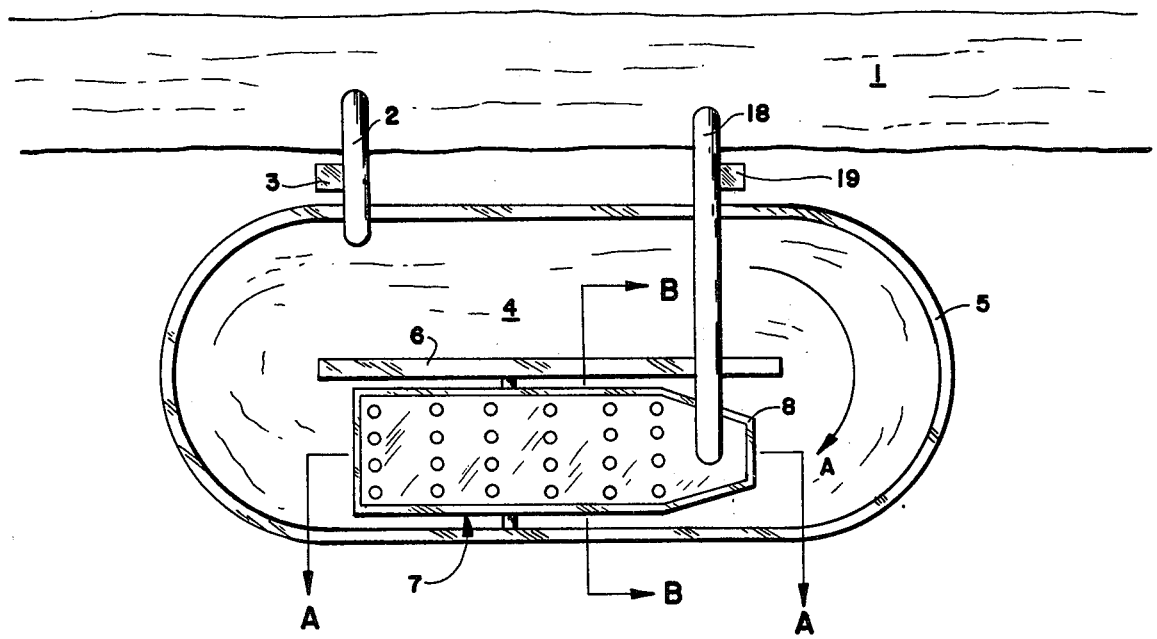
FIG. 1 is a schematic top view of a preferred oxidation ditch-clarifier assembly used in the process of this invention.

Referring now to FIG. 1, waste water in stream 1 is removed through conduit 2 by pumping devices 3 and dumped into oxidation ditch 4 formed by concrete walls 5 and 6, as shown. The diverted portion of the waste water stream is circulated about ditch 4 in the direction of arrow A. If the velocity of the waste water entering ditch 4 is not sufficient to create the necessary waste water flow rate in ditch 4, various conventional means can be used to achieve the desired flow rate.

Figure 2:
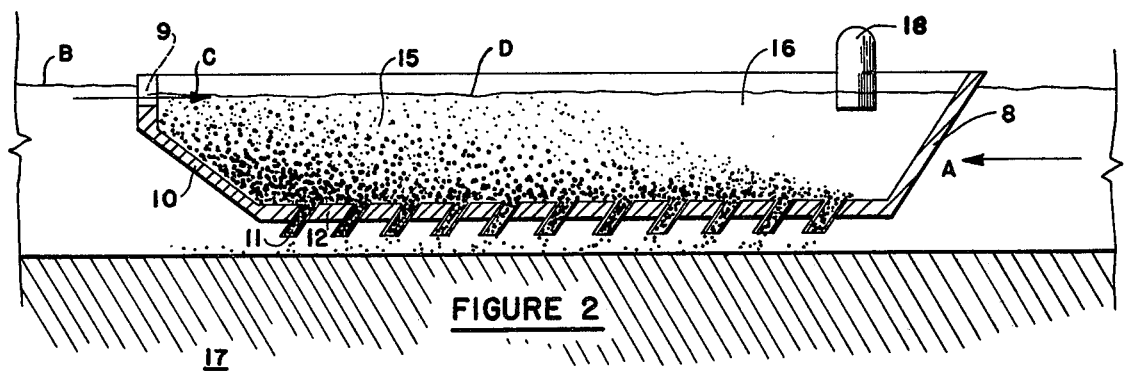
FIG. 2 is a cross-sectional view taken along lines A—A of FIG. 1, illustrating the phase separation of the waste water liquid in the clarifier.
Figure 3:
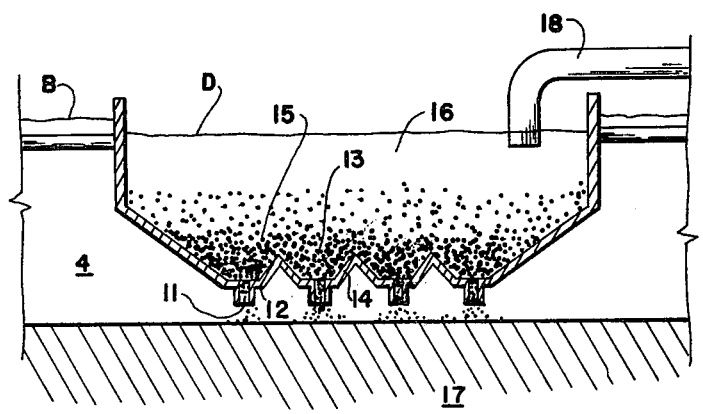
FIG. 3 is a cross-sectional view taken along lines B—B of FIG. 1 illustrating the flow of the sludge phase out the bottom ports of the clarifier.

A clarifier 7, such as described in U.S. Pat. No. 4,362,625 and 4,383,922, is positioned in ditch 4 whereby its front section 8 faces into the direction of arrow A. As is shown more clearly in FIGS. 2 and 3, clarifier 7 is provided with an opening 9 located in the rear section 10, which includes the back sides and the stern, but preferably the stern, and more preferably completely below the level B of the waste water in ditch 4. Clarifier 7 is also provided with a series of rows of ports 11 located in its bottom 12. As seen in FIG. 3, a preferred embodiment of clarifier 7 is the utilization of parallel troughs 13 formed by sloping sidewalls 14 wherein ports 11 are positioned at the bottom of troughs 13.

The movement of the waste water through opening 9 will cause the direction of flow C in clarifier 7 to be directed back toward arrow A. It has been found that this change in flow direction results in less turbulence in clarifier 7, and, thus, enabling a quicker separation of the waste water into a sludge phase 15 and a clarified phase 16.

While this process could be carried out in batch fashion by closing opening 9 after the desired amount of waste water has entered clarifier 7, it is preferred to operate the process in a continuous fashion. This is accomplished by waste water between bottom 12 and ditch floor 17 flowing at a faster rate than the flow rate in other portions of ditch 4. This faster rate creates a head differential between the liquids in the clarifier and in the ditch which results in drawing the waste water, particularly the sludge phase, out of clarifier 7 through ports 11. The flow rate through ports 11 is preferably controlled by varying the total cross-sectional area of ports 11 through which fluids can pass or by varying the head differential between the level of the waste water in the clarifier and the level B of the waste water in the ditch. In a preferred embodiment, the head differential is preferably controlled by raising or lowering clarifier 7 in ditch 4 in order to vary the cross-sectional area ratio of the waste water stream at clarifier 7 to a position in front of clarifier 7. The increased displacement of clarifier 7 in the ditch results in a greater flow rate past ports 11 and increases the flow rate of the sludge phase through ports 11.

As the waste water flows through opening 9 into clarifier 7, its velocity begins to decrease allowing heavier particles to drift toward bottom 12. This results in a liquid or sludge phase containing a higher percentage of the undesired particles located near the clarifier bottom, which are then drawn out through ports 11. It has been found that a preferred maximum flow rate inside clarifier 7 is up to 0.1 ft/sec. which, with proper sizing and positioning of ports 11, can achieve the preferred volume amounts ratio of sludge phase to clarified phase removed of 1:1 to 2:1.

As a final step, the clarified phase 16 is removed through conduit 18 by conventional pumping, gravity or syphon means 19 and returned to stream 1.

There are, of course, many obvious embodiments not specifically described, but which are intended to be included within the scope of this invention as defined by the following claims.

What I claim is:

1. A process for clarifying a waste water stream comprising:
   (a) circuitously flowing said waste water stream in an oxidation ditch having an elongated clarifier positioned therein with its front section heading into the flow of said waste water stream and positioned to decrease the cross-sectional area of said waste water stream in said oxidation ditch where said clarifier is located,
   (b) diverting a portion of said waste water stream into said clarifier in a countercurrent direction of the flow of said waste water stream in said oxidation ditch,
   (c) causing said portion to flow at a rate and distance sufficient to separate said portion into a clarified phase and a sludge phase,
   (d) removing said sludge phase wherein the volume amount of said sludge phase removed from said clarifier through said portion is controlled by varying the head differential between the level of said portion inside and the level of said waste water stream outside of said clarifier, and
   (e) removing said clarified phase from said clarifier.

2. A process according to claim 1 wherein said sludge phase is removed from said clarifier through ports positioned in the bottom of said clarifier.

3. A process according to claim 2 wherein the volume of said portion of the waste water stream diverted into said clarifier is controlled by varying the total cross-sectional area of said ports through which said sludge phase can pass.

4. A process according to claim 2 wherein the maximum flow rate of said portion into said clarifer is up to 0.1 ft/sec.

5. A process according to claim 1 wherein said head differential is varied by vertically moving said clarifier.

6. A process according to claim 1 wherein said sludge phase and said clarified phase are continuously being removed from said clarifier in volume amounts equal to the volume of said portion being continuously diverted into said clarifier to maintain a relative constant amount of waste water in said clarifier.

7. A process according to claim 6 wherein the volume amounts ratio of sludge phase to clarified phase removed is 1:1 to 2:1.

8. A process according to claim 1 wherein said portion of said waste water stream is diverted through an opening in the rear section of said clarifier.

9. A process according to claim 8 wherein said opening is completely located below level of said waste water in said oxidation ditch.

10. A process according to claim 8 wherein said rear section is the stern of said clarifier.

11. A process for clarifying a waste water stream comprising:
    (a) circuitously flowing said waste water stream in an oxidation ditch having an elongated clarifier positioned therein with its front section heading into the flow of said waste water stream and positioned to decrease the cross-sectional area of said waste water stream in said oxidation ditch where said clarifier is located,
    (b) diverting a portion of said waste water stream into said clarifier,
    (c) causing said portion to flow at a rate up to 0.1 ft/sec and a distance sufficient to separate said portion into a clarified phase and sludge phase having volume amounts ratio of said sludge to said clarified phase to be removed in between 1:1 and 2:1, and
    (d) removing separately said clarified phase and said sludge phase from said clarifier.

12. A process according to claim 11 wherein the volume of said portion of the waste water stream diverted into said clarifier is controlled by varying the total cross-sectional area of said ports through which said sludge phase can pass.

13. A process according to claim 11 wherein the volume of said sludge phase removed from said clarifier through said ports is controlled by varying the head differential between the level of said portion inside and the level of said waste water stream outside of said clarifier.

14. A process according to claim 11 wherein said sludge phase and said clarified phase are continuously being removed from said clarifier in volume amounts equal to the volume of said portion being continuously diverted into said clarifier to maintain a relative constant amount of waste water in said clarifier.

15. A process according to claim 11 wherein the portion of said waste water stream is diverted through an opening in the rear section of said clarifier.

16. A process for clarifying a waste water stream comprising:
    (a) circuitously flowing said waste water stream in an oxidation ditch having an elongated clarifier positioned therein with its front section heading into the flow of said waste water stream and positioned to decrease the cross-sectional area of said waste water stream in said oxidation ditch where said clarifier is located,
    (b) diverting a portion of said waste water stream into said clarifier, wherein the amount of said portion is controlled by varying the total cross-sectional area of ports positioned in the bottom of said clarifier,
    (c) causing said portion to flow at a rate and distance sufficient to separate said portion into a clarified phase and sludge phase, (d) removing said sludge phase from said clarifier through said ports, and (e) removing said clarified phase from said clarifier.

17. A process according to claim 16 wherein the volume of said portion of the waste water stream diverted into said clarifier is controlled by varying the total cross-sectional area of said ports through which said sludge phase can pass.

18. A process according to claim 16 wherein the volume of said sludge phase removed from said clarifier through said ports is controlled by varying the head differential between the level of said portion inside and the level of said waste water stream outside of said clarifier.

19. A process according to claim 18 wherein said head differential is varied by vertically moving said clarifier.

20. A process according to claim 16 wherein the maximum flow rate of said portion into said clarifier is up to 0.1 ft/sec.

21. A process according to claim 20 wherein the volume amounts ratio of sludge phase to clarified phase removed is 1:1 to 2:1.

22. A process according to claim 16 wherein said portion of said waste water stream is diverted through an opening in the rear section of said clarifier.

23. A process for clarifying a waste water stream comprising:

(a) circuitously flowing said waste water stream in an oxidation ditch having an elongated clarifier positioned therein with its front section heading into the flow of said waste water stream and positioned to decrease the cross-sectional area of said waste water stream in said oxidation ditch where said clarifier is located, (b) diverting a portion of said waste water stream into said clarifier, (c) causing said portion to flow at a rate and distance sufficient to separate said portion into a clarified phase and a sludge phase, (d) removing said sludge phase wherein the volume amount of said sludge phase removed from said clarifier through said portion is controlled by varying the head differential between the level of said portion inside and the level of said waste water stream outside of said clarifier, and (e) removing said clarified phase from said clarifier.

* * * * *